(12) United States Patent
Lee et al.

(10) Patent No.: US 7,940,771 B2
(45) Date of Patent: May 10, 2011

(54) APPARATUS AND METHOD FOR REQUESTING PACKET RETRANSMISSION IN A WIRELESS COMMUNICATION SYSTEM

(75) Inventors: Do-Young Lee, Suwon-si (KR); Soeng-Hun Kim, Suwon-si (KR); Hye-Jeong Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 677 days.

(21) Appl. No.: 12/041,082

(22) Filed: Mar. 3, 2008

(65) Prior Publication Data

US 2008/0219204 A1    Sep. 11, 2008

(30) Foreign Application Priority Data

Mar. 2, 2007   (KR) .................. 10-2007-0021183

(51) Int. Cl.
| | |
|---|---|
| H04L 12/28 | (2006.01) |
| H04L 12/56 | (2006.01) |
| H04L 1/00 | (2006.01) |
| H04L 12/26 | (2006.01) |
| H04L 1/18 | (2006.01) |
| H04J 3/16 | (2006.01) |
| H04J 3/22 | (2006.01) |

(52) U.S. Cl. ......... 370/394; 370/236; 370/469; 714/749
(58) Field of Classification Search .................. 370/235, 370/236, 394, 469; 714/748, 749
See application file for complete search history.

(56) References Cited

U.S. PATENT DOCUMENTS

| | | | |
|---|---|---|---|
| 2003/0227875 | A1 | 12/2003 | Wei et al. |
| 2008/0043619 | A1* | 2/2008 | Sammour et al. ............. 370/231 |

FOREIGN PATENT DOCUMENTS

WO   WO 2004/073273       8/2004

* cited by examiner

*Primary Examiner* — Ronald Abelson
(74) *Attorney, Agent, or Firm* — The Farrell Law Firm, P.C.

(57) ABSTRACT

A method for requesting packet retransmission in a wireless communication system is provided. The method includes checking, by a receiving-side Automatic Retransmission reQuest (ARQ) layer, sequence numbers of received packets to determine whether there is any missing packet, and starting a first timer in association with the missing packet; stopping the first timer upon receiving an Hybrid ARQ (HARQ) reception failure indicator corresponding to the missing packet, provided from a receiving-side HARQ layer; and stopping generation of a status report message corresponding to the missing packet, and waiting for an ARQ packet corresponding to the missing packet, retransmitted from a transmitting-side ARQ layer.

14 Claims, 8 Drawing Sheets

APPARATUS AND METHOD FOR REQUESTING PACKET RETRANSMISSION IN A WIRELESS COMMUNICATION SYSTEM

PRIORITY

This application claims priority under 35 U.S.C. §119(a) to a Korean Patent Application filed in the Korean Intellectual Property Office on Mar. 2, 2007 and assigned Serial No. 2007-21183, the disclosure of which is incorporated herein by reference.

BACKGROUND OF THE INVENTION

1. Field of the Invention

The present invention relates to an apparatus and method for requesting packet retransmission in a wireless communication system.

2. Description of the Related Art

The Universal Mobile Telecommunication Service (UMTS) system is a $3^{rd}$ generation asynchronous mobile communication system that uses Wideband Code Division Multiple Access (WCDMA) based on Global System for Mobile communications (GSM) and General Packet Radio Services (GPRS), both of which are European mobile communication systems.

The $3^{rd}$ Generation Partnership Project (3GPP), which is now in charge of the UMTS standardization, a discussion is being made on a Long Term Evolution (LTE) system as the next generation mobile communication system of the UMTS system.

The LTE system is a technology for realizing high-speed packet-based communication at about 100 Mbps, aiming at commercialization in around 2010. Regarding the commercialization of the LTE system, a discussion is being held on several schemes: one scheme for reducing the number of nodes located in a communication path by simplifying a configuration of the network, and another scheme for maximally approximating wireless protocols to wireless channels.

The LTE system uses Hybrid Automatic Retransmission reQuest (HARQ) as a scheme for increasing transmission efficiency of high-speed packets. Since it is not possible to meet various Quality-of-Service (QoS) requirements only with HARQ, an upper layer can use Automatic Retransmission reQuest (ARQ) distinguishable from HARQ.

A brief description of HARQ and ARQ will be given below.

HARQ is a technique for soft-combining previously received data with its retransmitted data without discarding the previously received data, thereby increasing a reception success rate. More specifically, a receiving-side HARQ entity determines the presence/absence of an error in a received packet, and sends an ACKnowledged (HARQ ACK) signal or a Non-ACKnowledged (HARQ NACK) signal to a transmitting side according to the presence/absence of an error. The transmitting side then retransmits a corresponding missing HARQ packet or transmits a new HARQ packet according to the HARQ ACK/NACK signal. The HARQ technique is characterized by soft-combining a retransmitted packet with its associated previously received packet to reduce an error occurrence probability.

ARQ is a technique for checking sequence numbers of received packets, and sending a retransmission request for a missing packet (a packet with a missing sequence number). ARQ does not soft-combine a previously received packet with its associated retransmitted packets.

In the existing wireless communication system, since ARQ and HARQ both serve to recover errored packets (packets in which an error has occurred), there is an opinion that there is no need to run the two techniques together. However, since it is hard to obtain a sufficiently low packet error ratio only with HARQ, there is an opinion that most packet services should undergo both ARQ and HARQ.

This is because in the HARQ technique, an HARQ ACK/NACK signal is defined as a 1-bit response signal, making it difficult to satisfy a low error rate through channel coding. When an HARQ NACK signal is misrecognized as an HARQ ACK signal in the wireless situation ('HARQ NACK/ACK error'), a corresponding HARQ packet is completely lost in an HARQ level (between HARQ layers). The reliability of the HARQ ACK/NACK signal serves as an important factor for the decision on a packet error ratio in the HARQ level. The wireless communication system intends to support fast retransmission of a missing packet by applying HARQ and ARQ.

Figure 1A:
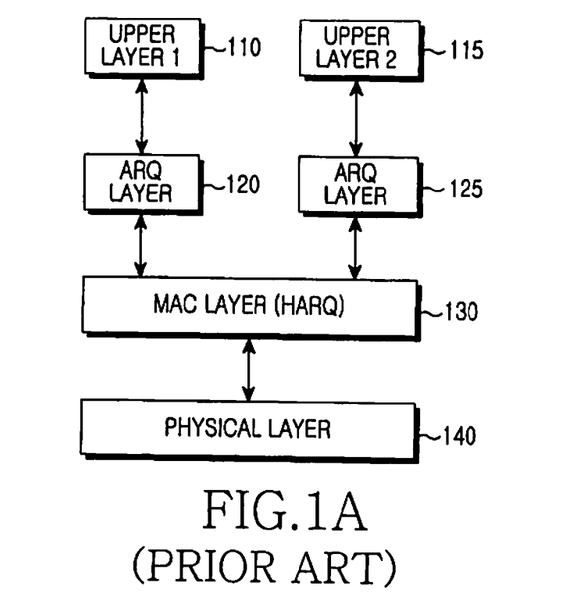
FIGS. 1A and 1B are diagrams illustrating a structure of a radio layer and a packet structure of the corresponding particular layer in a wireless communication system, respectively.
Figure 1B:
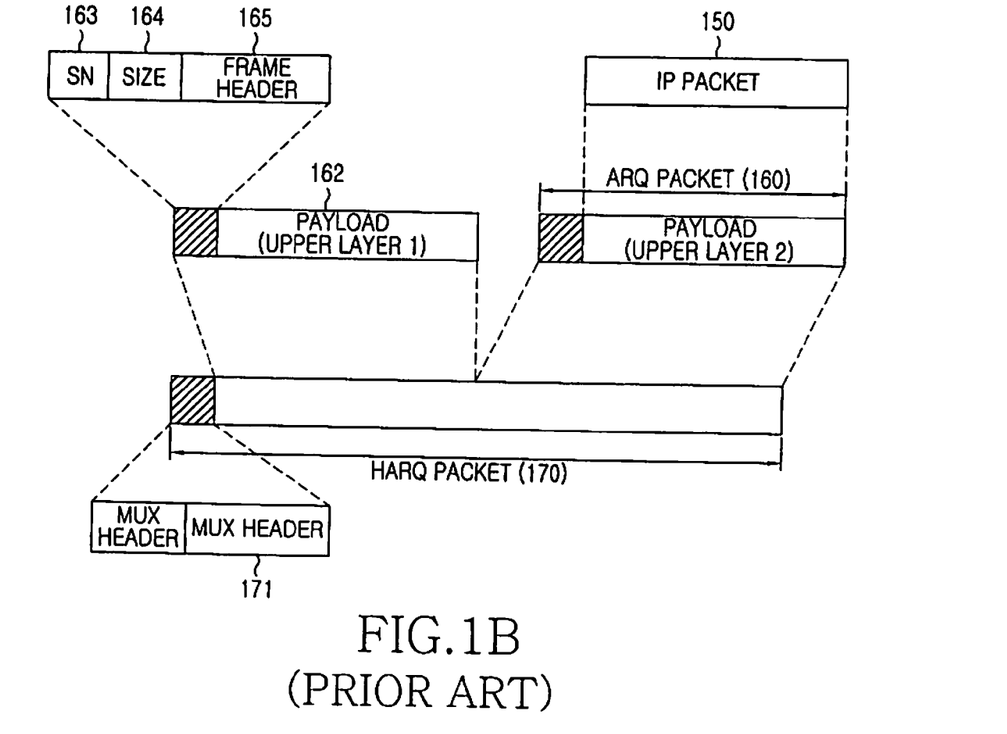

FIGS. 1A and 1B are diagrams illustrating a structure of a radio layer and a packet structure of the corresponding particular layer in a wireless communication system, respectively.

Referring to FIG. 1A, a radio layer structure (i.e., radio protocol structure) includes upper layers 110 and 115, ARQ layers 120 and 125, a Medium Access Control (MAC) layer 130 and a PHYsical (PHY) layer 140.

The upper layers 110 and 115 are protocol stacks configured separately for each service, and for example, an AMR codec/Real Time Protocol/User Datagram Protocol/Internet Protocol (codec/RTP/UDP/IP) or File Transfer Protocol/Transmission Control Protocol/Internet Protocol (FTP/TCP/IP) layer can be the upper layer.

The ARQ layers 120 and 125 can be configured for each service on a one-to-one basis, and satisfy a required Quality of Service (QoS).

The MAC layer 130 is connected to a plurality of ARQ layers 120 and 125, and multiplexes a plurality of ARQ packets to one HARQ packet. Further, the MAC layer 130 performs an HARQ operation on the multiplexed HARQ packet.

The physical layer 140 performs an operation of transmitting/receiving an HARQ packet over a wireless channel.

Referring to FIG. 1B, an ARQ packet is a packet reconfigured by allocating a sequence number to the data delivered from the upper layer so that the packet can undergo ARQ. An HARQ packet is a unit packet which is transmitted and received on the actual wireless channel through an HARQ operation.

The ARQ packet includes an ARQ packet header 161 composed of Sequence Number (SN) 163, size information 164 and framing information 165, and a payload 162 to which the actual data delivered from the upper layers 110 and 115 is allocated. For example, if an IP packet 150 is transferred from the upper layers 110 and 115 to the ARQ layers 120 and 125, the ARQ layers 120 and 125 can transmit all of the upper-layer IP packet 150 or can transmit only a part of the IP packet 150 taking into account the wireless channel situation or the scheduling situation. This is determined taking the QoS into consideration.

The sequence number 163 is a sequence number sequentially assigned to an ARQ packet 160, and the size information 164 is information indicating a size of the ARQ packet 160. Using the sequence number 163, the ARQ layers 120 and 125 store sequence numbers of ARQ packets in order, or configure ARQ packets by assembling. The framing information 165 is information used for allowing a receiving side to reconfigure a received packet based on a framing operation, and to normally restore it to the original upper layer packet (IP packet). The term 'framing' as used herein refers to a series of operations for reconfiguring the IP packet 150 delivered from the upper layers 110 and 115 in an appropriate size.

An HARQ packet 170 is composed of a multiplexing header 171 and a payload. The multiplexing header 171 includes multiplexing information of the ARQ packet 160. For example, an identifier 120/125 of a corresponding ARQ layer among the ARQ layers can be the multiplexing information. The payload is composed of at least lone of the multiplexed ARQ packets. It is obvious that such radio protocol structure and packet structure of a particular layer are commonly applied to the transmitting side and the receiving side.

Figure 2:
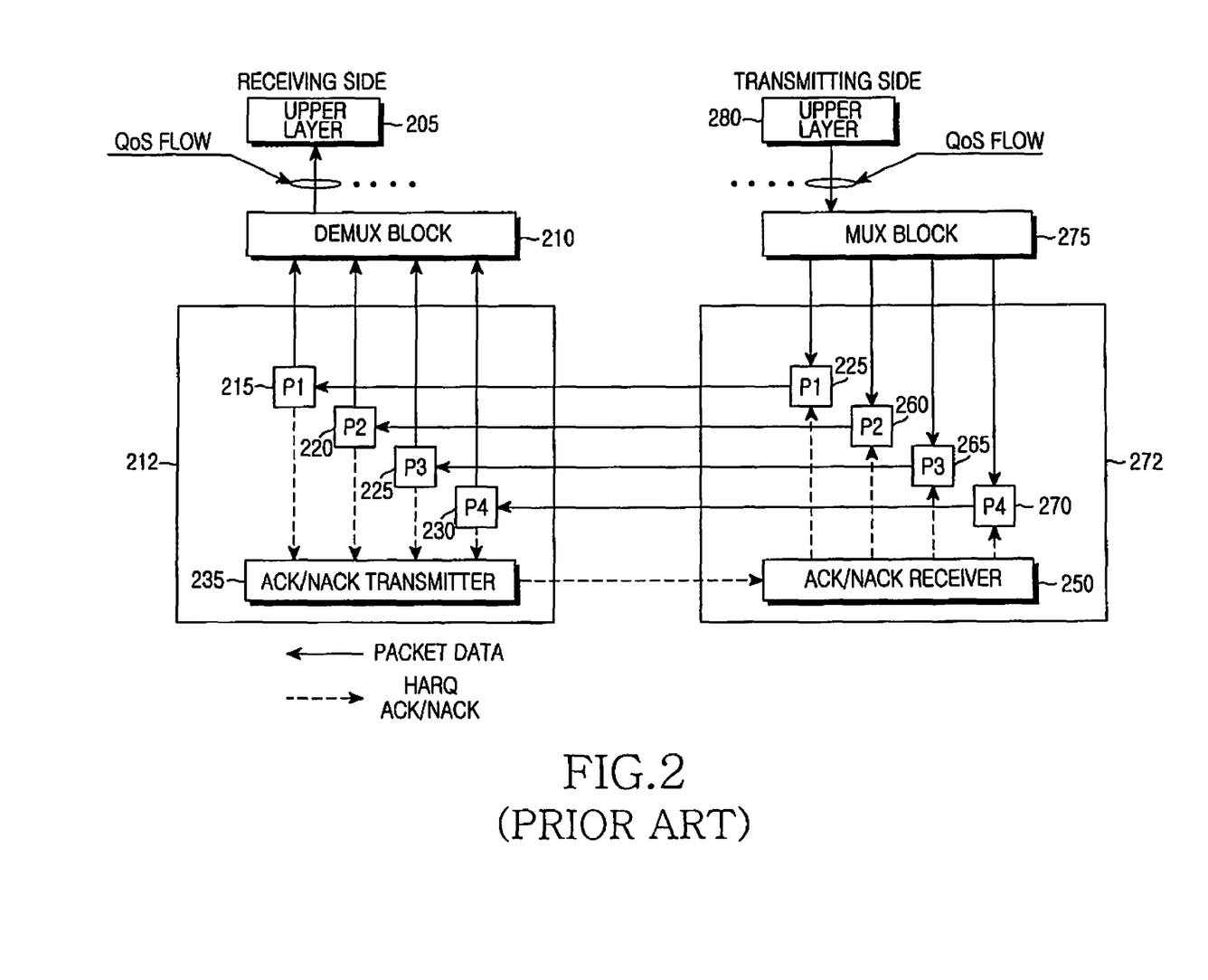
FIG. 2 is a diagram illustrating an HARQ operation.

FIG. 2 is a diagram illustrating an HARQ operation. More specifically, shown in FIG. 2 is a structure for performing HARQ between a transmitting side and a receiving side. When the structure supports an uplink packet service, a terminal serves as a transmitting side and a base station serves as a receiving side. On the contrary, when the structure supports a downlink packet service, a terminal serves as a receiving side and a base station serves as a transmitting side.

Referring to FIG. 2, when the wireless communication environment is considered in which various types of services coexist and can be supported, a transmitting side includes a plurality of upper layer blocks 280 and a multiplexing (MUX) block 275, and a receiving side includes a plurality of upper layer blocks 205 and a demultiplexing (DEMUX) block 210.

The upper layer blocks 205 and 280 can be regarded as, for example, a set of services requiring the same QoS, and for convenience, a flow occurring in one upper layer will be referred to herein as a 'QoS flow'.

The multiplexing block 275 serves to insert multiplexing information into the data generated by the several upper layers 280 and deliver the data to an HARQ block 272. On the other hand, the demultiplexing block 210 serves to deliver the data provided from an HARQ block 212 to an appropriate upper layer(s) using the multiplexing information included therein. In comparison with FIG. 1A, it can be understood that the multiplexing block 275 and the demultiplexing block 210 are devices included in the ARQ layers.

The HARQ blocks 212 and 272, devices for performing an HARQ operation, are each composed of several HARQ processors. The term 'HARQ processor' as used herein refers to a unit device that controls the transmission/reception of an HARQ packet. A transmitting-side HARQ processor is controls the transmission and retransmission of a user packet, and a receiving-side HARQ processor is controls the reception of an HARQ packet and transmission of a response signal. The 'response signal' as used herein includes an HARQ ACKnowledgement (HARQ ACK)/HARQ Negative ACKnowledgement (HARQ NACK) signal.

The HARQ blocks 212 and 272 exist in pairs in the transmitting side and the receiving side, and one pair of HARQ blocks 212 and 272 includes a plurality of HARQ processors, thereby enabling continuous transmission/reception of packets. An operation of the HARQ processor includes operations of transmitting an HARQ packet, receiving HARQ ACK/NACK information in response thereto, and performing retransmission according thereto.

For example, when there is only one HARQ processor, the HARQ processor cannot transmit another packet until it transmits user data and then receives HARQ ACK/NACK information in response thereto. However, when there are several HARQ processors, multiple HARQ processors are enabled while an arbitrary processor waits for an HARQ ACK/NACK, thereby enabling continuous transmission/reception of user data.

A basic operation of the HARQ processor is as follows.

A transmitting-side HARQ processor (an arbitrary HARQ P1 255, HARQ P2 260, HARQ P3 265 and HARQ P4 270) channel-codes a packet received from the multiplexing block 275 before transmission, and stores the channel-coded packet for the future retransmission. Upon receiving ACK information for the transmitted packet from the receiving side, the transmitting-side HARQ processor flushes the stored packet. However, upon receiving NACK information for the transmitted packet, the transmitting-side HARQ processor retransmits the same packet.

A receiving-side HARQ processor (an arbitrary HARQ P1 215, HARQ P2 220, HARQ P3 225 and HARQ P4 230) receives a packet over a physical channel, channel-decodes the received packet, and determines whether there is any error detected in the packet. The error detection can be achieved through a Cyclic Redundancy Check (CRC) calculation.

Upon detecting the presence of an error, the receiving-side HARQ processor stores the packet, and sends an HARQ NACK signal to the transmitting side. Upon receiving a retransmission packet for the packet, the receiving-side HARQ processor soft-combines the stored packet with the retransmitted packet, and then determines again whether there is any error. If it is determined that there is still an error, the receiving-side HARQ processor sends an HARQ NACK signal and repeats the HARQ operation. However, if the error is cleared, the receiving-side HARQ processor sends an HARQ ACK signal to the transmitting side and transfers the user data to the demultiplexing block 210.

In this way, the receiving side requests retransmission of the errored HARQ packet, and soft-combines the retransmitted data with its associated previously received data, making it possible to increase HARQ reception performance. However, it is inefficient to accomplish a very low Block Error Rate (BLER) only with the HARQ operation, for the following two reasons.

1. When an error occurs in the HARQ ACK or NACK signal itself, the HARQ processor cannot detect the occurrence of an error.

2. Since HARQ transmission/retransmission is performed within a relatively short time, the HARQ processor cannot obtain time diversity gain.

For example, when the receiving side falls into a deep fading area for several tens of msec, even though HARQ retransmission is performed, it is hard to finally determine that the HARQ packet has been successfully transmitted. Therefore, an ARQ operation is needed to compensate for the limit of the HARQ operation.

Figure 3:
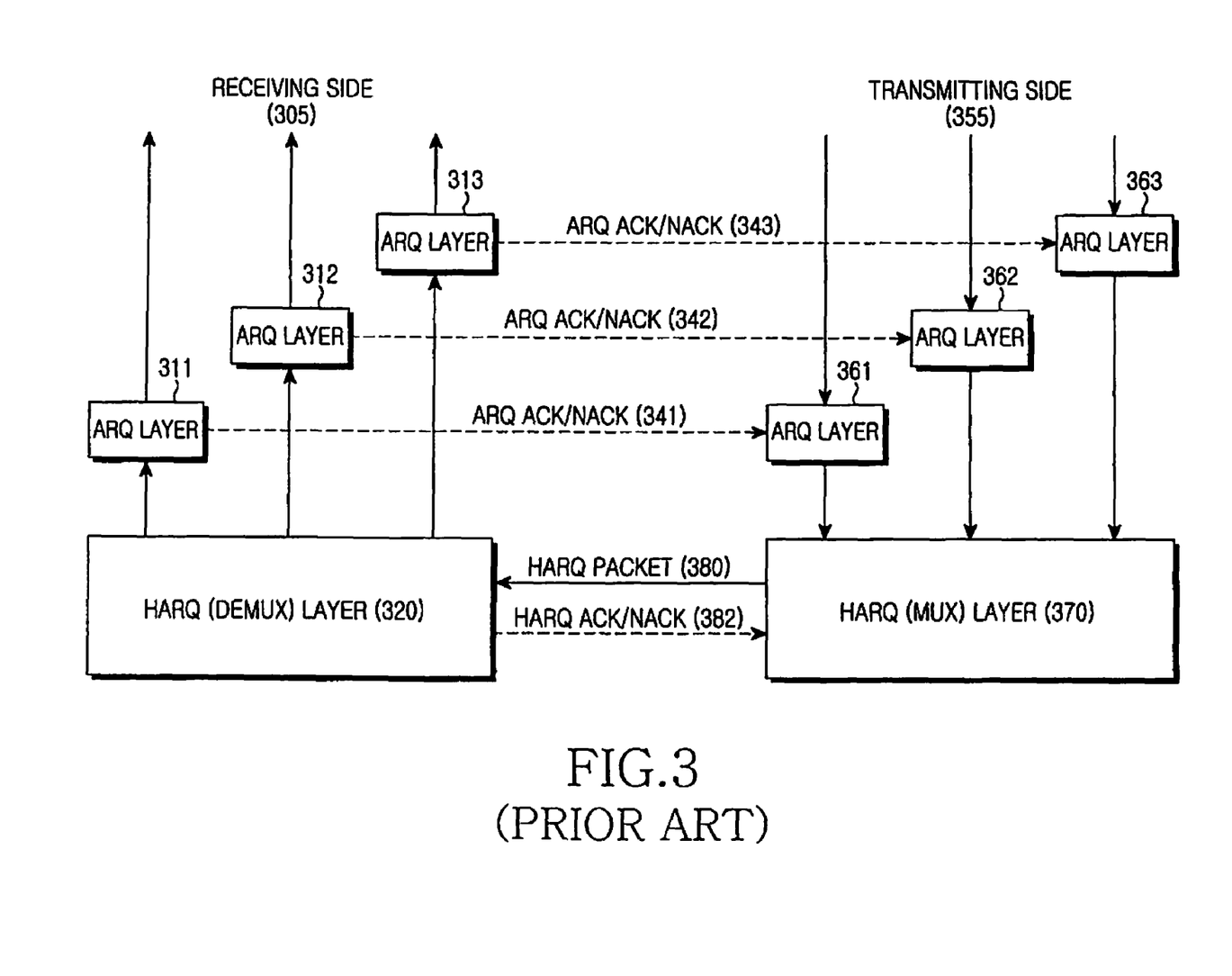
FIG. 3 is a diagram illustrating an operation of retransmitting a packet by applying HARQ and ARQ.

FIG. 3 is a diagram illustrating an operation of retransmitting a packet by applying HARQ and ARQ.

Referring to FIG. 3, an ARQ operation is performed by transmitting-side ARQ layers 361, 362 and 363 and receiving-side ARQ layers 311, 312 and 313.

The transmitting-side ARQ layers 361, 362 and 363, even after transmitting an upper layer packet provided from an upper layer, store the ARQ packet in their own retransmission buffers in preparation for retransmission. The transmitting-side ARQ layers 361, 362 and 363 each configure an ARQ packet(s) corresponding to the amount of data to be transmitted in a transmission period. The transmitting-side ARQ layers can meet the amount of transmission data by making several ARQ packets, or can make one ARQ packet corresponding to the amount of transmission data. If a size of the ARQ packet to be made is not equal to a size of the upper layer packet, the transmitting-side ARQ layers can fragment the upper layer packet to deliver only a part thereof, or can deliver a plurality of upper layer packets. In this case, the transmitting-side ARQ layers configure an ARQ packet by inserting sequence number information, size information and framing information into a desired transmission packet. The transmitting-side ARQ layers deliver the ARQ packet to a lower layer, and store it in their retransmission buffers in preparation for retransmission. Herein, the lower layer is composed of an HARQ layer 370, or a MAC layer, and a physical layer.

The HARQ layer 370 multiplexes the provided ARQ packet to an HARQ packet, and then transmits the HARQ packet to a receiving side over a physical channel, shown at 380.

In the receiving side, a physical layer receives the HARQ packet over a physical channel. A MAC/HARQ layer 320 demultiplexes the received HARQ packet to restore it to an ARQ packet, and then delivers the ARQ packet to the receiving-side ARQ layers 311, 312 and 313. The receiving-side ARQ layers 311, 312 and 313 each are composed of an assembly block, a reception buffer, a retransmission management block, etc. The reception buffer stores an ARQ packet received from the HARQ layer 320 according to its sequence number, and delivers assemblable ARQ packets to the assembly block.

The ARQ retransmission management block checks sequence numbers of ARQ packets stored in the reception buffer, and sending ARQ ACK signals for the received ARQ packets and ARQ NACK signals for missing ARQ packets to the transmitting-side ARQ layers 361, 362 and 363, shown at 341, 342 and 343. The ARQ assembly block reconfigures the original upper layer packet using the ARQ packets depending on framing headers of the ARQ packets provided from the reception buffer, and delivers the upper layer packet to an upper layer.

Upon receiving an ACK signal for the previously transmitted ARQ packet from the receiving-side ARQ layers 311, 312 and 313, the transmitting-side ARQ layers 361, 362 and 363 flush the corresponding ARQ packet from their ARQ retransmission buffers. However, upon receiving a NACK signal, the transmitting-side ARQ layers 361, 362 and 363 schedule retransmission of the corresponding ARQ packet.

As described above, the ARQ layers perform retransmission in units of ARQ packets. The transmitting-side ARQ layers 361, 362 and 363 each attach a sequence number to an ARQ packet before transmission, and the receiving-side ARQ layers 311, 312 and 313 check sequence numbers of the received ARQ packets to determine whether there is any missing ARQ packet.

For example, if a receiving-side ARQ layer has normally received an ARQ packet with a sequence number X and an ARQ packet with a sequence number X+2, but has failed to receive an ARQ packet with a sequence number X+1, the receiving-side ARQ layer sends to a transmitting-side ARQ layer a retransmission request for the ARQ packet with an sequence number X+1. That is, the receiving-side ARQ layer sends a NACK signal to the transmitting-side ARQ layer in response to the non-receipt of the ARQ packet with a sequence number X+1, requesting retransmission of the ARQ packet with X+1.

An HARQ operation performed independently of the ARQ operation is as follows.

The transmitting-side HARQ layer 370 transmits an HARQ packet configured by multiplexing a plurality of ARQ packets. Upon receiving an HARQ NACK from the receiving-side HARQ layer 320 in response to the HARQ packet, the transmitting-side HARQ layer 370 retransmits the HARQ packet. Upon failure to receive an HARQ ACK, the transmitting-side HARQ layer 370 repeats the retransmission operation as many times as the maximum number of retransmissions. If the transmitting-side HARQ layer 370 fails to receive an HARQ ACK even after the transmitting-side HARQ layer 370 repeats the retransmission operation as many times as the maximum number of retransmissions, the transmitting-side HARQ layer 370 abandons transmission of the corresponding HARQ packet, which means transmission failure of the multiplexed ARQ packet.

When the transmission failure caused by the limited number of HARQ retransmissions (Maximum Retransmission Limit) occurs as stated above, fast retransmission based on packet transmission is difficult.

As described above, in the conventional wireless communication system, the HARQ operation and the ARQ operation operate independently of each other. Not only the HARQ ACK/NACK signal exchanged between the transmitting-side HARQ layer and the receiving-side HARQ layer, but also the ARQ ACK/NACK signal exchanged between the transmitting-side ARQ layer and the receiving-side ARQ layer are undesirably transmitted separately by the corresponding processors. As a result, the limited wireless resources cannot be efficiently used by the signals exchanged between the paired layers.

As HARQ and ARQ operate independently of each other, reliable packet retransmission cannot be guaranteed.

Therefore, in the wireless communication system for supporting a high-speed packet service, there is a need for a detection and retransmission scheme of a missing packet(s), in which speed and reliability between the transmitting side and the receiving side is guaranteed. In addition, there is a demand for a packet retransmission scheme capable of efficiently using the limited wireless resources.

SUMMARY OF THE INVENTION

An aspect of the present invention is to address at least the problems and/or disadvantages described herein and to provide at least the advantages described below. Accordingly, an aspect of the present invention is to provide an apparatus and method for requesting packet retransmission in a wireless communication system.

Another aspect of the present invention is to provide an apparatus and method for detecting and recovering a loss of a missing packet in a wireless communication system.

Further another aspect of the present invention is to provide an apparatus and method for controlling transmission/reception of a status report message for a missing packet, between Automatic Retransmission reQuest (ARQ) layers, in a wireless communication system supporting a high-speed packet service.

Yet another aspect of the present invention is to provide an apparatus and method for transmitting/receiving a minimum number of status report messages between ARQ layers in a wireless communication system supporting a high-speed packet service.

Still another aspect of the present invention is to provide an apparatus and method for fast transmitting/receiving a status report message between ARQ layers in a wireless communication system supporting a high-speed packet service.

According to one aspect of the present invention, there is provided a method for requesting packet retransmission in a wireless communication system. The method includes checking, by a receiving-side Automatic Retransmission reQuest (ARQ) layer, sequence numbers of received packets to determine whether there is any missing packet, and if it is determined that there is a packet missing, starting a first timer in association with the missing packet; stopping the first timer upon receiving an Hybrid ARQ (HARQ) reception failure indicator corresponding to the missing packet, provided from a receiving-side HARQ layer; and stopping generation of a status report message corresponding to the missing packet, and waiting for an ARQ packet corresponding to the missing packet, retransmitted from a transmitting-side ARQ layer.

According to another aspect of the present invention, there is provided a method for requesting packet retransmission in a wireless communication system. The method includes detecting, by a receiving-side Hybrid Automatic Retransmission reQuest (HARQ) layer, an HARQ reception failure according to a missing packet, and sending a reception failure indicator corresponding to the missing packet to a receiving-side Automatic Retransmission reQuest (ARQ) layer; starting, by the receiving-side ARQ layer, a second timer in response to the reception failure indicator; checking, by the receiving-side ARQ layer, a sequence number of a packet provided from the receiving-side HARQ layer to detect a presence of a missing packet, and stopping the second timer upon detecting the presence of a missing packet; generating, by the receiving-side ARQ layer, a status report message corresponding to the missing packet, and sending the status report message to a transmitting-side ARQ layer; and waiting for an ARQ packet retransmitted from the transmitting-side ARQ layer.

According to further another aspect of the present invention, there is provided an apparatus for requesting packet retransmission in a wireless communication system. The apparatus includes a Hybrid Automatic Retransmission reQuest (HARQ) layer for requesting HARQ retransmission by checking a received packet; and an Automatic Retransmission reQuest (ARQ) layer including a first timer used for waiting for a set time for transmission of a status report message corresponding to a missing packet, and a status report generator for checking a packet provided from the HARQ layer to detect presence/absence of a missing packet, starting the first timer, stopping the first timer upon receipt of an HARQ reception failure indicator caused by HARQ retransmission from the HARQ layer, determining to stop the transmission of the status report message, and waiting for an ARQ packet retransmitted from a transmitting-side ARQ layer according to the missing packet.

According to yet another aspect of the present invention, there is provided an apparatus for requesting packet retransmission in a wireless communication system. The apparatus includes a Hybrid Automatic Retransmission reQuest (HARQ) layer for requesting HARQ retransmission by checking a received packet; and an Automatic Retransmission Request (ARQ) layer including a second timer used for waiting for a set time for transmission of a status report message corresponding to a missing packet, and a status report generator for starting the second timer upon receipt an HARQ reception failure indicator caused by HARQ retransmission from the HARQ layer, checking a packet provided from the HARQ layer to detect presence/absence of a missing packet, stopping the second timer upon detecting the presence of a missing packet, generating a status report message corresponding to the detected missing packet, sending the status report message to a transmitting-side ARQ layer, and waiting for an ARQ packet retransmitted in response to the status report message.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides an apparatus and method for requesting packet retransmission in a wireless communication system. In particular, the present invention provides a scheme for efficiently performing retransmission for the transmission of a missing packet in a system supporting a high-speed packet service. The proposed scheme transmits/receives a minimum number of ARQ ACK/NACK signals between ARQ layers, transmits/receives an HARQ ACK/NACK signal caused by packet retransmission between HARQ layers, and uses a Local NACK between the HARQ layer and the ARQ layer. The term 'Local NACK' as used herein refers to an operation in which an HARQ layer transmits, to an ARQ layer, the information indicating a transmission failure for an arbitrary packet.

Figure 4:
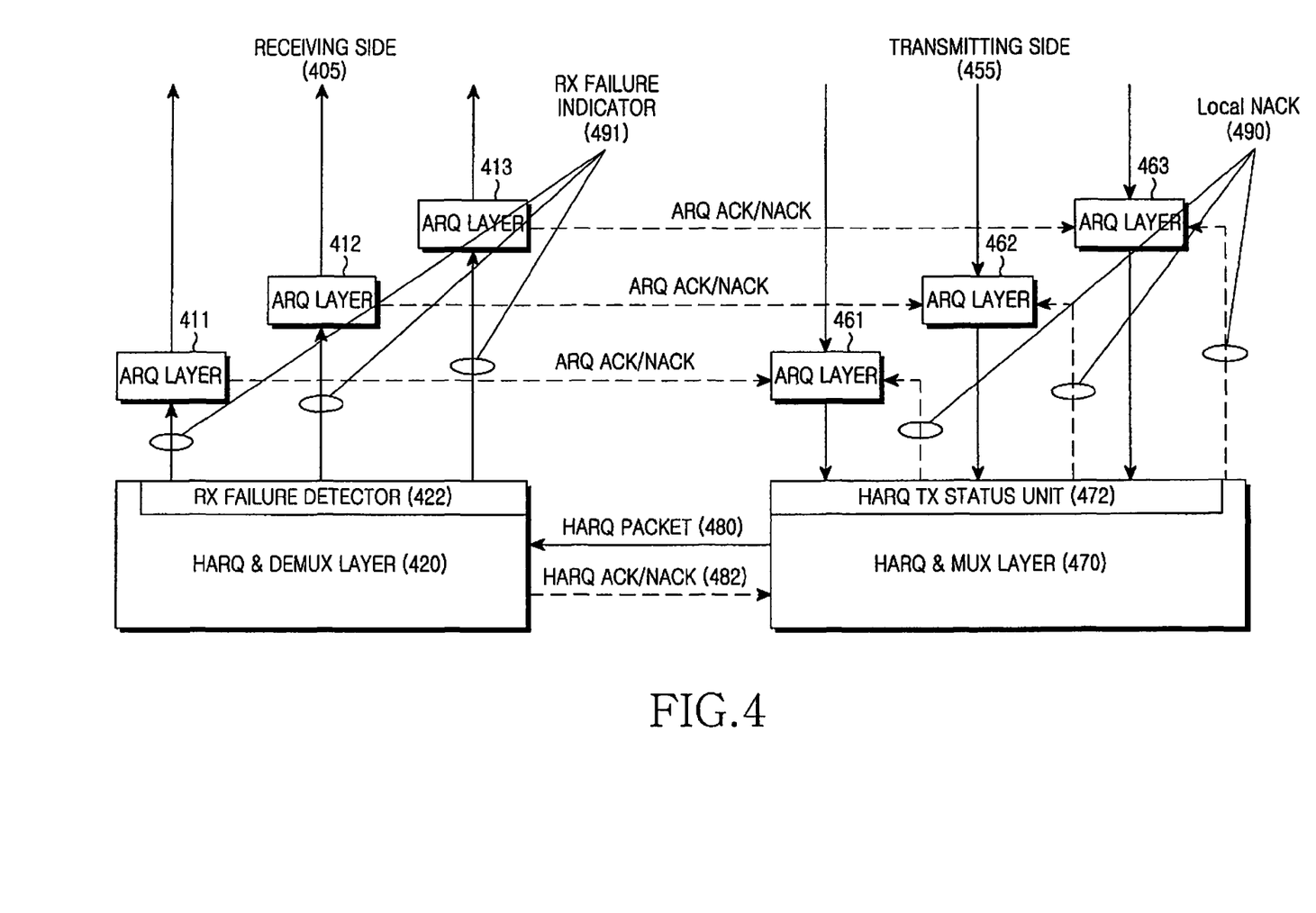
FIG. 4 is a diagram illustrating an operation of retransmitting a packet by applying a Local NACK.

FIG. 4 is a diagram illustrating an operation of retransmitting a packet by applying a Local NACK. Specifically, shown in FIG. 4 is an operation of an HARQ layer and an ARQ layer, proposed for solving the problems inherent in a system of FIG. 3.

Referring to FIG. 4, a transmitting-side HARQ layer 470 uses a method for providing information on the presence/absence of a packet transmission failure to transmitting-side ARQ layers 461, 462 and 463. In other words, the transmitting-side HARQ layer 470 sends a Local NACK to the transmitting-side ARQ layers 461, 462 and 463 so that they finally determine the need, or lack thereof, for the retransmission of the arbitrary packet.

Upon receiving the Local NACK, the transmitting-side ARQ layers 461, 462 and 463 prepares to retransmit the corresponding ARQ packet.

A receiving-side HARQ layer 420 performs an HARQ operation on the previously transmitted packet, and upon failure to normally receive the packet, sends an HARQ NACK signal to the transmitting-side HARQ layer 470. The receiving-side HARQ layer 420 allows the transmitting-side HARQ layer 470 to perform the HARQ retransmission.

In particular, a reception failure detector 422 in the receiving-side HARQ layer 420 performs error detection on the received HARQ packet separately for (i) the case where the corresponding HARQ packet is not received even after the retransmission has reached the maximum number of retransmissions, and (ii) the case where no HARQ retransmission packet has been received.

The reception failure detector 422 sends an HARQ reception failure indicator 491 separated for the two failure-detected cases, to receiving-side ARQ layers 411, 412 and 413. In other words, based on the operation of the reception failure detector 422, the corresponding processors 411, 412 and 413 for processing a particular packet of their receiving-side ARQ layers send an ARQ NACK signal to their associated transmitting-side ARQ processors 461, 462 and 463.

In addition, depending on the operation of the reception failure detector 422, the receiving side waits for a retransmission HARQ packet to be received over a physical channel. Even though the receiving side has sent an HARQ NACK signal for the missing packet according to the HARQ operation, an initial-transmission HARQ packet rather than a retransmission HARQ packet is received, a reception failure is detected.

The reception failure can be determined in the case where a reception failure is detected even after the NACK transmission has reached the maximum number of HARQ retransmissions, and/or the case where a NACK/ACK error has occurred in which a NACK signal is misrecognized as an ACK signal in the wireless channel. The receiving side 405 includes the HARQ layer 420 to send an ACK/NACK signal for the packet transmitted from the transmitting-side HARQ layer 470 within the maximum number of retransmissions.

In order to prevent a transmission loss for a transmission packet, the receiving-side ARQ layers 411, 412 and 413 configure a status report message for the transmission packet and send an ACK/NACK signal for every transmission packet. As a result, the receiving-side ARQ layers 411, 412 and 413 send an ARQ NACK signal to the transmitting-side ARQ layers 461, 462 and 463, to request retransmission of the corresponding packet. In this state, actually, the receiving-side ARQ layers 411, 412 and 413 have no information on the cause why the missing ARQ packet has occurred.

The transmitting-side ARQ layers 461, 462 and 463 are in preparation for the retransmission of the missing ARQ packet depending on the Local NACK provided from the transmitting-side HARQ layer 470. The receiving-side ARQ layers 411, 412 and 413, even though they have detected the missing ARQ packet, have no need to send an ARQ NACK signal. This is because the transmitting-side ARQ layers 461, 462 and 463 retransmit the corresponding ARQ packet in response to the Local NACK.

However, the current wireless communication system presents no method capable of avoiding such unnecessary ARQ NACK transmission. Such unnecessary ARQ NACK signal transmission itself can be a waste of wireless resources. What is worse, the transmitting-side ARQ layers 461, 462 and 463, which have received the unnecessary ARQ NACK signal, retransmit the unnecessary ARQ packet, wasting the wireless resources.

As mentioned above, since the transmitting side 455 has no information on the cause why the missing ARQ packet has occurred even though there is a situation where the receiving-side ARQ layers 411, 412 and 413 should immediately send an ARQ NACK signal due to the occurrence of a packet transmission failure which is not detected through the Local NACK operation, the receiving-side ARQ layers 411, 412 and 413 cannot quickly send an ARQ NACK at an appropriate time.

As a result, the missing packet cannot be fast recovered, causing a reduction in the packet transmission/reception speed. Due to this, the LTE system supporting high-speed packet transmission cannot support efficient packet retransmission.

The present invention provides a scheme for controlling an ARQ operation and an HARQ operation of a receiving side and a transmitting side by clearly defining the Local NACK operation.

The present invention provides a scheme in which an HARQ layer detects a packet loss which is not overcome with the Local NACK, and controls not to perform a retransmission request for the unnecessary transmission loss packet, thereby fast retransmitting the packet without a waste of the limited wireless resources.

When a Local NACK occurs, a transmitting-side HARQ layer detects an HARQ reception failure. If a detection of a missing ARQ packet has occurred in a receiving-side ARQ device even though no HARQ reception failure is detected, it can mean the occurrence of a packet loss which was not detected even with the Local NACK. Therefore, the present invention proposes a scheme in which the receiving side checks the detection/non-detection of a missing ARQ packet and the detection/non-detection of an HARQ reception failure to determine whether a packet loss has occurred, thereby efficiently recovering the packet loss.

According to the present invention, the receiving side determines whether detection of an HARQ reception failure has occurred, a predetermined time before and a predetermined time after a missing packet detected time. The present invention includes setting Timer 1 as the receiving side detects an HARQ reception failure a predetermined time after the missing packet detected time, and setting Timer 2 to detect an HARQ reception failure a predetermined time before the missing packet detected time.

Even if a missing ARQ packet has occurred, the present invention controls not to send an ARQ NACK signal, i.e., a status report message, for the missing ARQ packet considered to undergo a recovery process for a missing ARQ packet by the Local NACK. In addition, when it is determined that a packet loss which was not detected even when the Local NACK has occurred, the present invention controls the ARQ layer to quickly generate a status report. Further, if no ARQ packet loss occurs for the set Timer, the present invention controls to send an ARQ NACK signal because the corresponding packet loss is a packet loss which was not detected even with the Local NACK.

Figure 5:
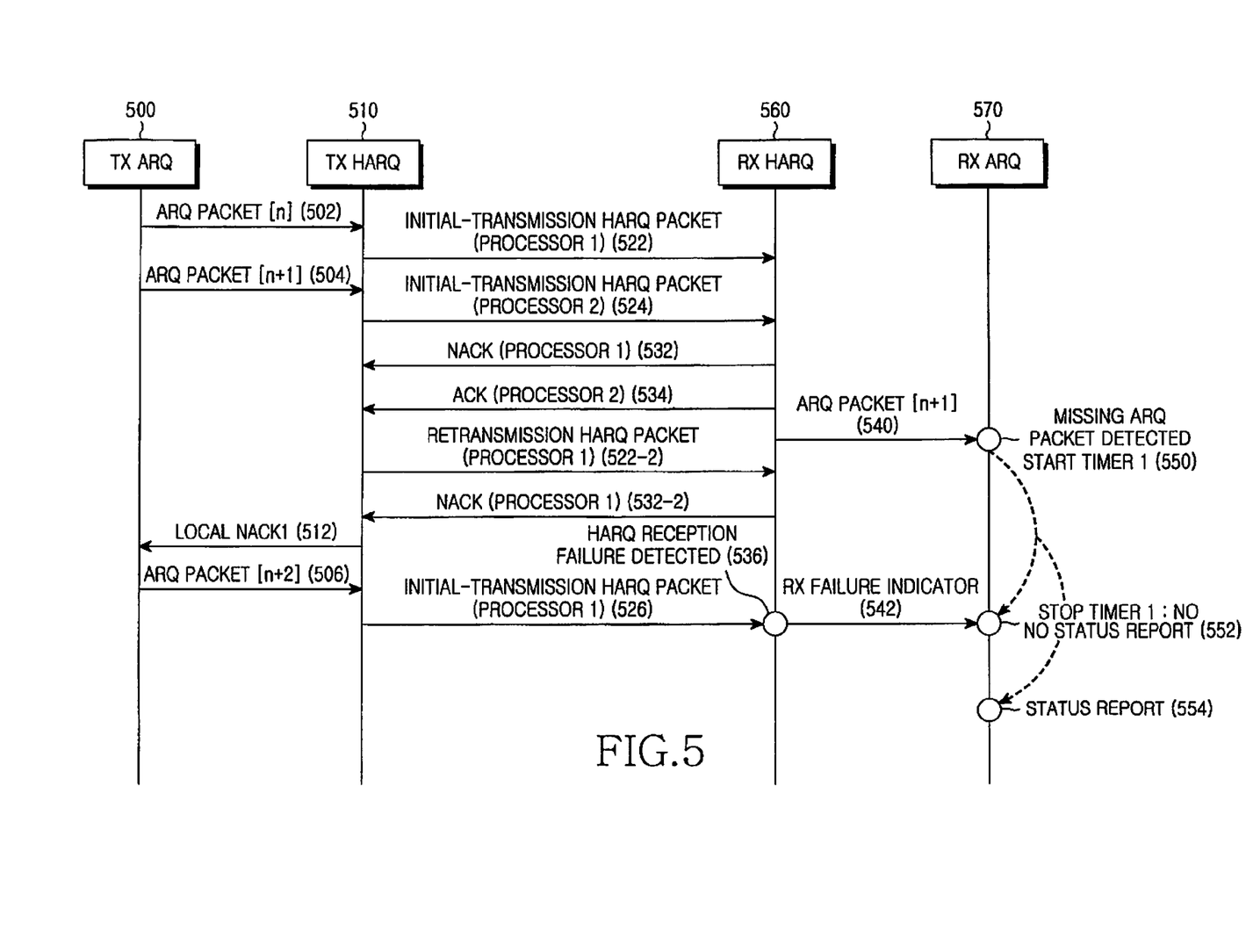
FIG. 5 is a diagram illustrating an operation of requesting packet retransmission according to a first embodiment of the present invention.

FIG. 5 is a diagram illustrating an operation of requesting packet retransmission according to a first embodiment of the present invention. Specifically, shown in FIG. 5 are an HARQ operation and an ARQ operation of a transmitting side and a receiving side, for detecting and recovering a lost packet. In addition, FIG. 5 provides a detailed description of an HARQ operation and an ARQ operation according to the present invention, when a Local NACK occurs.

Referring to FIG. 5, a transmitting side includes an ARQ layer 500 and an HARQ layer 510, a receiving side associated with the transmitting side includes an HARQ layer 560 and an ARQ layer 570. Each HARQ layer includes at least one HARQ processor according to the service. The HARQ layer includes a plurality of HARQ processors to transmit packets simultaneously or sequentially, thereby supporting efficient packet transmission.

In step 502, the transmitting-side (TX) ARQ layer 500 configures an ARQ packet (packet data unit) with IP packets provided from an upper layer. The transmitting-side ARQ layer 500 performs a framing operation of segmenting/assembling the provided IP packets according to an appropriate size, i.e., ARQ packet size. Each of the framed ARQ packets is delivered to the HARQ layer 510, or a lower layer, after a sequence number is added thereto.

The transmitting-side (TX) HARQ layer 510 configures at least one HARQ packet which is a unit transmission block by multiplexing at least one provided ARQ packets. For convenience, a description of the present invention is given herein for an exemplary case where one HARQ packet is configured with one ARQ packet. Since the method in which the HARQ layer configures a packet in units of transmission blocks is not directly related to the present invention, a detailed description thereof will be omitted herein for simplicity.

In step 502, the transmitting-side ARQ layer 500 delivers an ARQ packet with a sequence number n to the transmitting-side HARQ layer 510.

The transmitting-side HARQ layer 510 allocates ARQ packets provided sequentially or in a predetermined order, to a plurality of HARQ processors. Each HARQ processor retransmits each HARQ packet allocated considering a response signal from the receiving side, within the predetermined maximum number of retransmissions. For example, the HARQ layer 510 allocates an HARQ packet with an ARQ packet [n] to an HARQ processor 1. The HARQ processor 1 of the transmitting-side HARQ layer 510 transmits in step 522 an HARQ packet [n] to a receiving-side HARQ processor 1. Here, the HARQ packet [n] is an initial-transmission HARQ packet.

In step 504, the transmitting-side ARQ layer 500 delivers an ARQ packet with a sequence number n+1 to the transmitting-side HARQ layer 510. In step 524, the transmitting-side HARQ layer 510 allocates an ARQ packet [n+1] to an HARQ processor 2, and the HARQ processor 2 of the transmitting-side HARQ layer 510 transmits an HARQ packet [n+1] to a receiving-side HARQ processor 2. Here, the HARQ packet [n+1] is an initial-transmission HARQ packet.

The respective HARQ processors, i.e., HARQ processors 1 and 2, in the receiving-side (RX) HARQ layer 560 channel-decode the received HARQ packet [n] and HARQ packet [n+1], respectively, and then determine whether there is any error detected therein. If it is determined that there is no error, the HARQ processors 1 and 2 send an ACK signal to the corresponding HARQ processors in the transmitting-side HARQ layer 510, and if it is determined that there is an error, the HARQ processors 1 and 2 send a NACK signal to the corresponding HARQ processors in the transmitting-side (TX) HARQ layer 510. For example, in step 532, the receiving-side HARQ processor 1 sends a NACK signal to the transmitting-side (TX) HARQ processor 1, and in step 534, the receiving-side HARQ processor 2 sends an ACK signal to the transmitting-side HARQ processor 2.

In step 540, the receiving-side HARQ layer 560 demultiplexes the normally received HARQ packet [n+1] and delivers the result to the receiving-side (RX) ARQ layer 570.

In step 550, the receiving-side ARQ layer 570 determines that an ARQ packet with a sequence number n+1 is first received even though an ARQ packet with a sequence number n was not received. Then the receiving-side ARQ layer 570 detects the occurrence of a missing ARQ packet, and activates Timer 1 for a predetermined time in association with the missing ARQ packet.

Upon receiving the NACK signal, the processor 1 of the transmitting-side HARQ layer 510 transmits an HARQ packet [n] to the receiving-side HARQ processor 1 in step 522-2. Here, the HARQ packet [n] is a retransmission HARQ packet.

The processor 1 of the receiving-side HARQ layer 560, which has received the retransmitted HARQ packet [n], determines whether there is any error detected therein, and sends a NACK signal to the processor 1 of the transmitting-side HARQ layer 510 in step 532-2. The HARQ retransmission is repeated until there is no error detected, within the maximum number of retransmissions.

Upon determining that the retransmission has failed even though repeated transmission of the HARQ packet [n] is performed within the predetermined maximum number of retransmissions, the transmitting-side HARQ layer 510 sends to the transmitting-side ARQ layer 500 a Local NACK notifying that the transmission of the HARQ packet [n] has failed. Upon receiving the Local NACK, the transmitting-side ARQ layer 500 prepares to schedule retransmission of an ARQ packet with a sequence number n.

Step 506 represents packet transmission for a sequence number n+2 succeeding the sequence number n and the sequence number n+1. The transmitting-side ARQ layer 500 delivers an ARQ packet with a sequence number n+2 to the transmitting-side HARQ layer 510. In step 526, the transmitting-side HARQ layer 510 allocates ARQ packet [n+2] to the HARQ processor 1, and the HARQ processor 1 of the transmitting-side HARQ layer 510 transmits an HARQ packet [n+2] to the receiving-side HARQ layer 560. Here, the HARQ packet [n+2] is an initial-transmission HARQ packet.

The receiving-side HARQ layer 560, which has received the HARQ packet [n+2], detects a reception failure in the HARQ layer in step 536 as the HARQ packet [n+2] with a new sequence number is received even though it has sent an HARQ NACK signal for the HARQ packet [n].

In step 542, recognizing that the reception of the HARQ packet [n] had failed even for the maximum number of HARQ retransmissions, the receiving-side HARQ layer 560 sets a reception failure indicator therefor and delivers it to the receiving-side ARQ layer 570. Upon receiving the reception failure indicator, the receiving-side ARQ layer 570 stops Timer 1 activated in step 550. Further, the ARQ layer determines that there is no need for the generation of a status report message for the previously detected missing ARQ packet [n]. The transmitting-side ARQ layer 500, which has received the Local NACK in step 512, is making a retransmission preparation for the ARQ packet [n]. The ARQ layer 570 of the receiving side determines not to send a status report message, i.e., NACK message, for the ARQ packet [n], and waits for the ARQ packet [n] to be transmitted later.

In step 554, the receiving-side ARQ layer 570, which has failed to receive a reception failure indicator when Timer 1 expires, generates and sends a status report message for the ARQ packet [n] which is a missing packet.

As described above, the receiving-side ARQ layer 570 of the present invention detects a missing packet and receives a Local NACK provided from the HARQ layer, and depending thereon, controls transmission of a status report message frequently transmitted/received for every missing packet between the transmitting-side ARQ layer 500 and the receiving-side ARQ layer 570. Such transmission control of the status report message can provide an opportunity capable of using the limited wireless resources for transmission of other messages. The transmission control provides a situation where the wireless communication system can efficiently use the limited wireless resources. In addition, the transmission control can minimize the procedure in which the ARQ layer generates and transmits the status report message.

Figure 6:
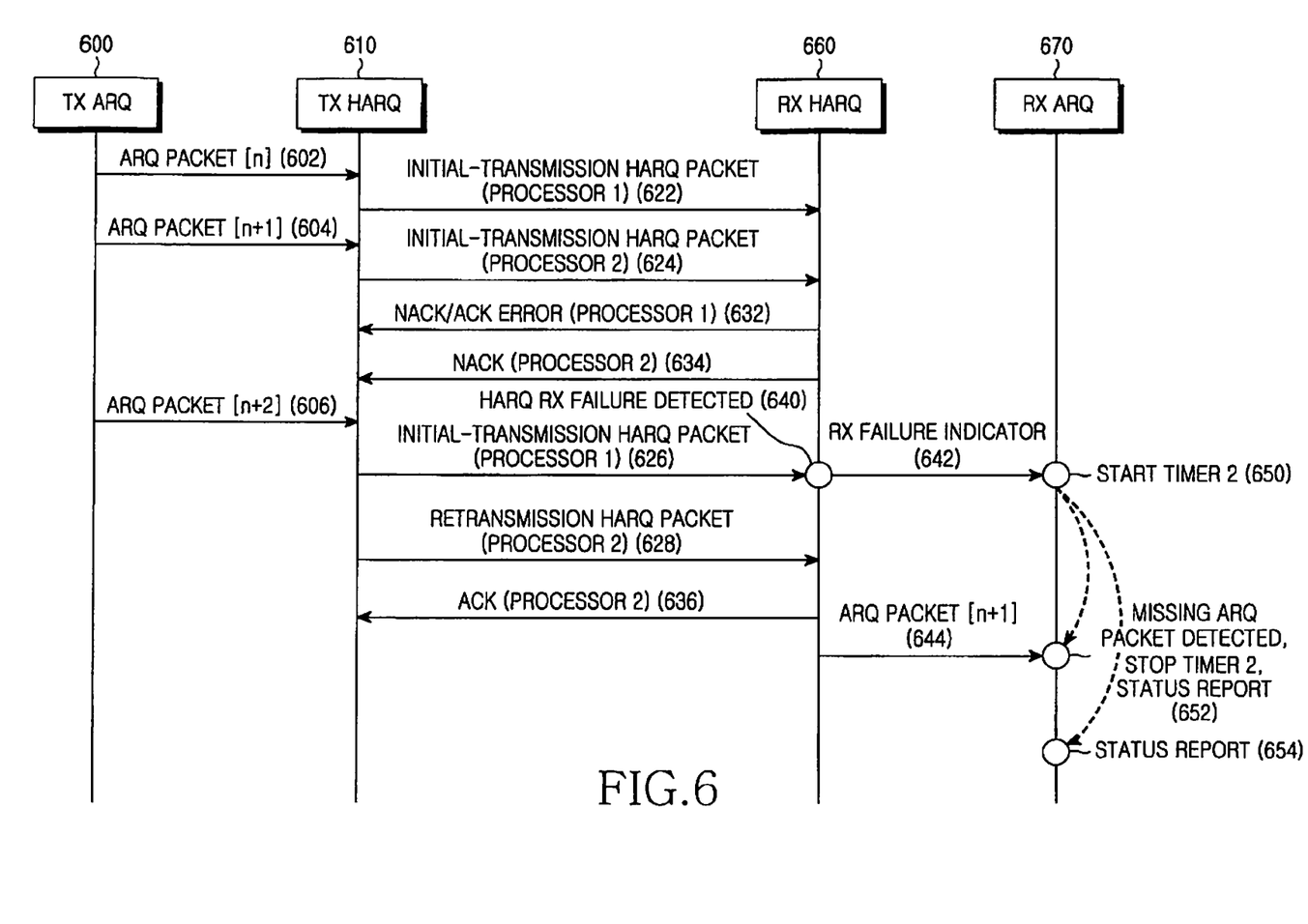
FIG. 6 is a diagram illustrating an operation of requesting packet retransmission according to a second embodiment of the present invention.

FIG. 6 is a diagram illustrating an operation of requesting packet retransmission according to a second embodiment of the present invention.

Referring to FIG. 6, a transmitting side includes an ARQ layer 600 and an HARQ layer 610, and a receiving side also includes an HARQ layer 660 and an ARQ layer 670, making pairs. Each HARQ layer includes a plurality of HARQ processors to increase efficiency of packet transmission.

In step 602, the transmitting-side (TX) ARQ layer 600 configures an ARQ packet (packet data unit) with IP packets provided from an upper layer. The transmitting-side ARQ layer 600 performs framing on the provided IP packets, and then adds a sequence number to each ARQ packet. The transmitting-side ARQ layer 600 sequentially delivers the sequence number-added ARQ packet to the HARQ layer 610 which is its lower layer. Particularly, in step 602, the transmitting-side ARQ layer 600 delivers an ARQ packet with a sequence number n to the transmitting-side (TX) HARQ layer 610. In step 604, the transmitting-side ARQ layer 600 delivers an ARQ packet with a sequence number n+1 to the transmitting-side HARQ layer 610.

The transmitting-side HARQ layer 610 allocates an HARQ processor in order to process the provided ARQ packet. For example, it is assumed that an HARQ processor 1 is allocated for the ARQ packet [n], and an HARQ processor 2 is allocated for the ARQ packet [n+1].

Thus, the HARQ processor 1 configures the HARQ packet [n], the HARQ processor 2 configures the HARQ packet [n+1], and the transmitting-side HARQ layer 610 sequentially transmits them to the receiving-side HARQ layer 660. Particularly, in step 622, the HARQ processor 1 of the transmitting-side HARQ layer 610 transmits the HARQ packet [n] to a processor 1 of the receiving-side (RX) HARQ layer 660, and in step 624, the HARQ processor 2 of the transmitting-side HARQ layer 610 transmits the HARQ packet [n+1] to a processor 2 of the receiving-side HARQ layer 660. Here, the HARQ packet [n] and the HARQ packet [n+1] are initial-transmission HARQ packets. Herein, the HARQ processors 1 and 2 retransmit HARQ packets with the same sequence number according to a response signal provided from the receiving-side HARQ layer 660, within the predetermined maximum number of retransmissions.

In step 632, the transmitting-side HARQ layer 610 receives a NACK/ACK-errored response signal from the receiving-side HARQ layer 660. For example, even though the receiving-side HARQ layer 660 has sent a NACK signal upon detecting a transmission failure of the HARQ packet [n], because the wireless environment is not uniform, the transmitting-side HARQ layer 610 actually receives a degraded ACK signal.

In this case, the receiving-side HARQ layer 660 is waiting for an HARQ packet [n] in response to the transmitted HARQ NACK signal, and the transmitting-side HARQ layer 610 has received an ACK signal according to the wireless environment. The transmitting-side HARQ layer 610 determines to transmit an HARQ packet [n+2], considering that the HARQ packet [n] has been normally transmitted.

In step 634, the transmitting-side HARQ layer 610 normally receives an HARQ NACK signal from the receiving-side HARQ layer 660. For example, in this state, the receiving-side HARQ layer 660 sends an HARQ NACK signal for the HARQ packet [n+1] and then waits for the HARQ packet [n]. The transmitting-side HARQ layer 610 determines to transmit the HARQ packet [n+1] in response to the HARQ NACK signal.

The transmitting-side HARQ layer 610 configures an HARQ packet [n+2] using an ARQ packet with a sequence number n+2, provided in step 606, and transmits it to the receiving-side HARQ layer 660 in step 626.

In step 640, the receiving-side HARQ layer 660 detects a reception failure of the HARQ packet [n], as it determines that the HARQ packet [n+2] is received even though it waits for the HARQ packet [n]. Thus, the receiving-side HARQ layer 660 sends a reception failure indicator to the receiving-side (RX) ARQ layer 670 in step 642. The reception failure indicator is set as a reception failure indicator for a reception failure before the maximum number of retransmissions. The reception failure indicator is set as a reception failure caused by an HARQ NACK/ACK error.

In step 650, the receiving-side ARQ layer 670 activates Timer 2 for a predetermined time considering the reception failure indicator.

In step 628, the receiving-side HARQ layer 660 receives an HARQ packet [n+1] in response to the HARQ NACK sent in step 634. In step 636, the receiving-side HARQ layer 660 transmits an ACK signal to the transmitting-side HARQ layer 610, determining that the HARQ packet [n+1] is normally received. In step 644, the receiving-side HARQ layer 660 demultiplexes the successfully received HARQ packet [n+1] and delivers an ARQ packet associated with a sequence number n+1 to the receiving-side ARQ layer 670.

Therefore, in step 652, the receiving-side ARQ layer 670 stops Timer 2, determining that the ARQ packet [n] is not received for the predetermined time of Timer 2.

In step 654, the receiving-side ARQ layer 670 generates a status report message indicating the presence of a missing packet, and sends the status report to the transmitting-side ARQ layer 600.

In the second embodiment of the present invention, after receiving a reception failure indicator from the receiving-side HARQ layer 660, if the receiving-side ARQ layer 670 determines that the corresponding packet is a missing packet for a predetermined time of Timer 2, the receiving-side ARQ layer 670 immediately sends a status report message. The second embodiment controls the ARQ operation so that the receiving-side ARQ layer 670 rapidly sends a status report message, recognizing that a packet loss has occurred due to the reason such as a NACK/ACK error for the missing packet [n].

Figure 7A:
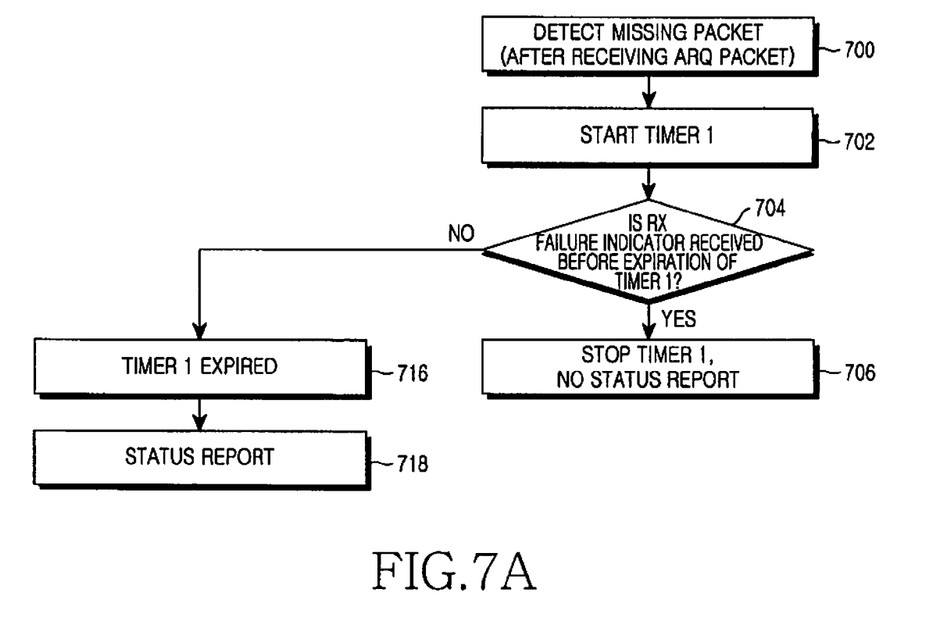
FIGS. 7A and 7B are signal flow diagrams illustrating an operation of an ARQ layer according to the present invention.
Figure 7B:
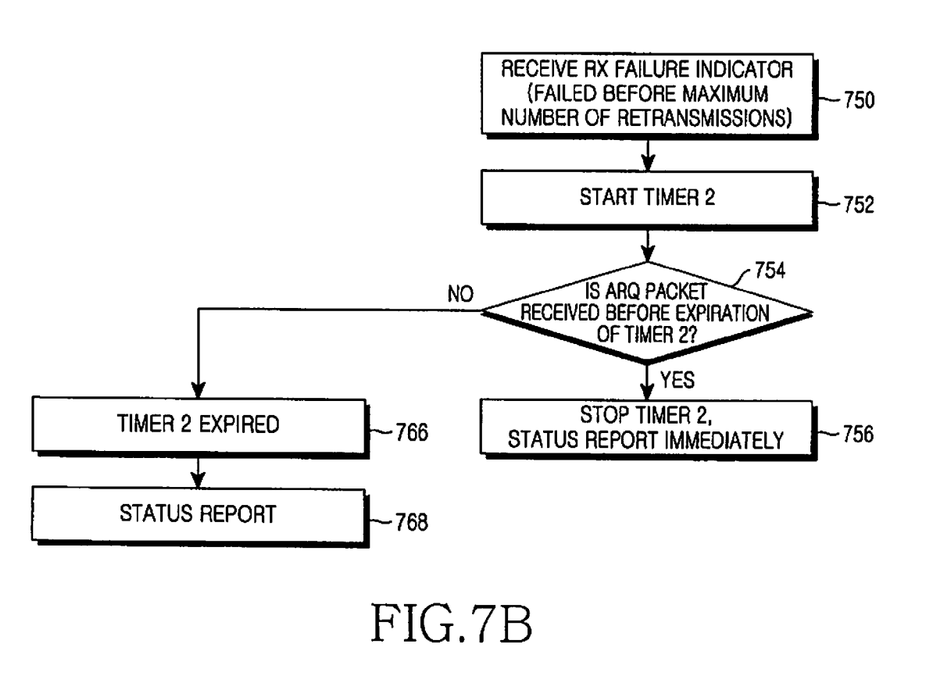

FIGS. 7A and 7B are signal flow diagrams illustrating an operation of an ARQ layer according to the present invention. Particularly, shown in FIGS. 7A and 7B is an ARQ operation of receiving a reception failure indicator and/or a packet from an HARQ layer.

Referring to FIG. 7A, in step 700, an ARQ layer receives a packet provided from an HARQ layer and determines whether there is any missing packet. For example, the ARQ layer can determine the presence of a missing packet as it receives a packet [n+1] even though it should now receive an ARQ packet [n] from the HARQ layer.

In step 702, the ARQ layer starts Timer 1 and waits for retransmission of the ARQ packet [n]. This is because an HARQ retransmission operation will be performed on the packet [n] which is a missing packet, between HARQ layers.

In step 704, the ARQ layer receives a reception failure indicator from the HARQ layer. In this case, if the ARQ layer receives the reception failure indicator before expiration of Timer 1, the ARQ layer proceeds to step 706. The ARQ layer checks a type of the reception failure indicator. The reception failure indicator can be an indicator indicating that an HARQ packet [n] is not detected even though an HARQ operation has been performed between HARQ layers (between a receiving-side HARQ layer and a transmitting-side HARQ layer) within the maximum number of retransmissions.

Regarding the HARQ operation, the transmitting-side HARQ layer has delivered a Local NACK to the transmitting-side ARQ layer in response to the missing packet [n]. In step 706, the receiving-side ARQ layer, detecting such situation, stops Timer 1 and sends no status report to the transmitting-side ARQ layer. This is because the transmitting-side ARQ layer is preparing for retransmission of the ARQ packet [n] in response to the Local NACK. The receiving-side ARQ layer has no need to configure a status report message, and there is no need to prepare separate wireless resources for transmission of the status report message, between the ARQ layers. As a result, the limited wireless resources can be used for a channel for transmission of other information.

If the receiving-side ARQ layer has received the reception failure indicator after the expiration of Timer 1, the receiving-side ARQ layer proceeds to step 716. As Timer 1 expires, the receiving-side ARQ layer sends a status report to the transmitting-side ARQ layer in step 718.

Referring to FIG. 7B, in step 750, an ARQ layer receives a reception failure indicator from an HARQ layer. The reception failure indicator is an indicator indicating whether a missing packet is detected due to a NACK/ACK error. The reception failure indicator is an indicator indicating that a reception failure occurred before the maximum number of retransmissions.

In step 752, the ARQ layer starts Timer 2, and waits for the retransmission of an ARQ packet [n]. This is because an HARQ retransmission operation will be performed on the packet [n] which is a missing packet, between the HARQ layers.

In step 754, the receiving-side ARQ layer determines that the packet [n] is a missing packet even before expiration of Timer 2. In step 756, the receiving-side ARQ layer stops Timer 2 and immediately makes a status report. As the reception failure is caused by the NACK/ACK error, it is preferable for the ARQ layer to immediately make a status report, in terms of recovery of the missing packet.

On the other hand, in step 766, if the ARQ layer fails to detect the presence of a missing packet caused by the HARQ operation until the expiration of Timer 2, the ARQ layer operates in a wait state. After expiration of Timer 2, the ARQ layer sends a status report to the transmitting-side HARQ layer in step 768.

As described above, upon receiving an ARQ packet, the ARQ layer checks states of Timer 1 and Timer 2. If Timer 1 is in operation, it is considered that the Local NACK has occurred in the transmitting side. Thus, the ARQ layer operates in the wait state as a retransmission packet will be received even though it does not make a status report. Therefore, the receiving-side ARQ layer stops Timer 1 and does not send a status report.

On the other hand, if Timer 2 is in operation, because a packet loss which cannot be overcome by the Local NACK has occurred in the transmitting side, the receiving-side ARQ layer immediately makes a status report so that the transmitting-side ARQ layer can perform retransmission rapidly. Therefore, the ARQ layer stops Timer 2 and generates a status report.

Figure 8:
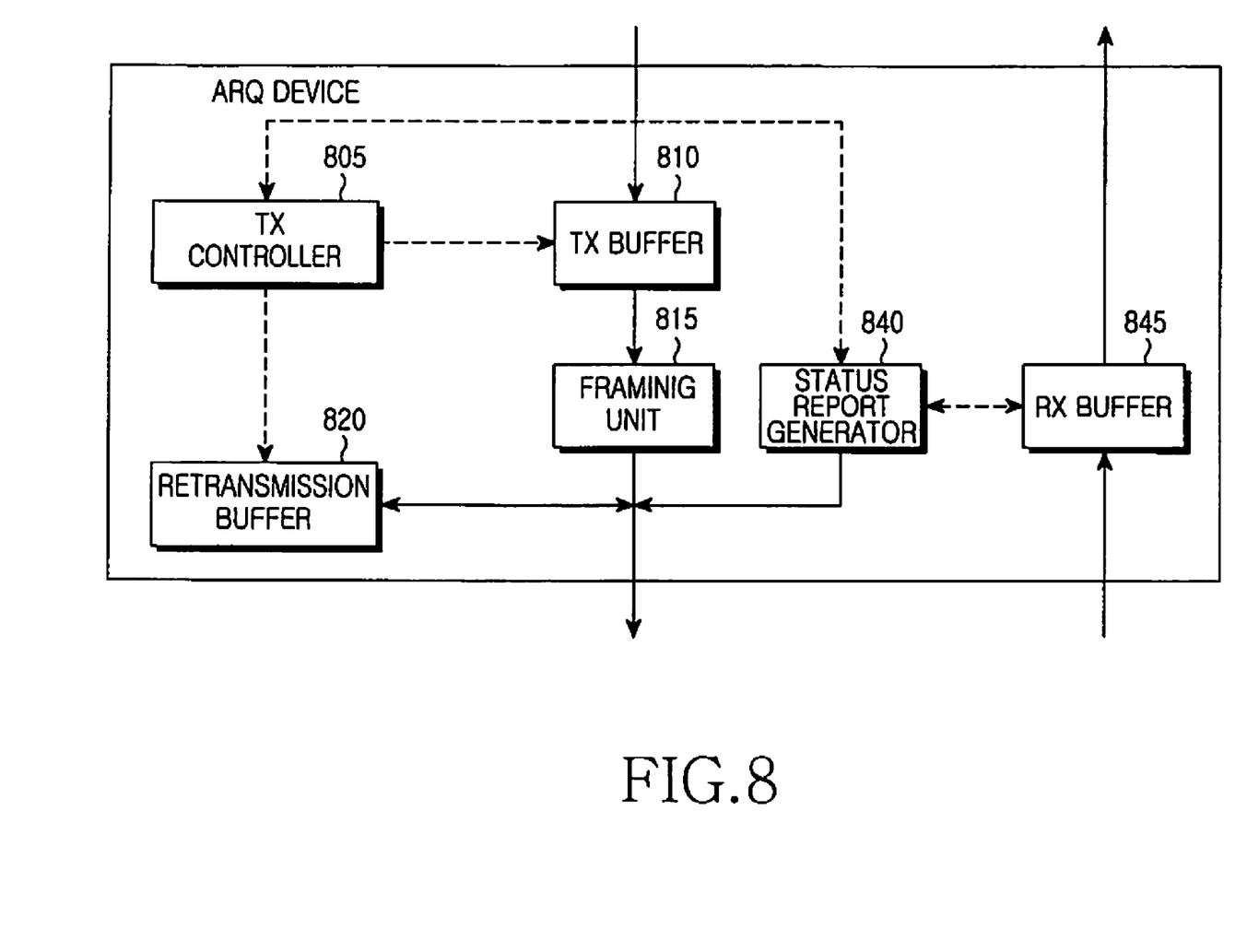
FIG. 8 is a diagram illustrating a structure of an ARQ layer according to the present invention.

FIG. 8 is a diagram schematically illustrating a structure of an ARQ layer according to the present invention.

Referring to FIG. 8, a transmitting-side ARQ layer and a receiving-side ARQ layer each include a transmission controller 805, a transmission buffer 810, a framing unit 815, a retransmission buffer 820, a status report generator 840, and a reception buffer 845. The blocks in operation are different according to the transmission operation and the reception operation.

For example, according to the present invention, a transmitting-side ARQ device includes the transmission controller 805, the transmission buffer 810, the framing unit 815, and the retransmission buffer 820, and a receiving-side ARQ device includes the reception buffer 845 and the status report generator 840.

The transmitting-side ARQ device will first be described.

A packet provided from an upper layer is delivered to the transmission buffer 810. Transmission packet streams accumulated in the transmission buffer 810 are segmented/assembled in units of transmission blocks in the framing unit 815. The operation of segmenting/assembling the transmission packet in units of transmission blocks is called 'framing'. The framed packet is transmitted to the receiving side over a wireless channel.

The transmitting-side ARQ device determines whether it will transmit a new packet in the transmission buffer or whether it will retransmit the previously transmitted packet in the retransmission buffer in response to a status report message transmitted from the receiving-side ARQ device. Under the control of the transmission controller 805, the packet in the transmission buffer 810 or the retransmission buffer 820 is transmitted to the receiving-side ARQ device over the wireless channel.

Next, the receiving-side ARQ device will be described.

The reception buffer 845 of the receiving-side ARQ device stores a packet transmitted over a wireless channel. The status report generator 840 determines whether any error has occurred in the transmission packet. If an error occurs in the received packet, the status report generator 840 generates a NACK signal. For a normally received packet, the status report generator 840 generates an ACK signal.

The status report generator 840 according to the present invention receives a reception failure indicator provided from an HARQ layer. The status report generator 840 determines the occurrence of a missing packet depending on the reception failure indicator and the reception buffer 845. Further, the status report generator 840 determines whether to send an ARQ NACK signal in response to the missing packet. In other words, when it is determined that the reception failure indicator from the HARQ layer is an indicator indicating that an HARQ packet [n] is not detected even though an HARQ operation has been performed between HARQ layers (between the receiving-side HARQ layer and the transmitting-side HARQ layer) within the maximum number of retransmissions, i.e., as HARQ retransmission is being performed in the HARQ layer in association with the reception failure indicator, the status report generator 840 controls not to send a separate status report message. This is because regarding the HARQ operation, the transmitting-side HARQ layer sends a Local NACK to the transmitting-side ARQ layer in response to the missing packet. Thus, the status report generator 840 stops Timer 1 and does not generate a status report message.

When the reception failure indicator is determined as an indicator caused by HARQ NACK/ACK, because a packet loss which cannot be overcome by the Local NACK has occurred, the status report generator 840 immediately makes a status report so that the ARQ layer can rapidly perform retransmission. As a result, the status report generator 840 stops Timer 2 and immediately sends a status report.

In this case, the receiving-side ARQ device manages the values of Timer 1 and Timer 2, and controls an operation of the status report generator 840.

As is apparent from the foregoing description, according to the present invention, when the receiving-side ARQ layer sends a retransmission request for a missing packet to the transmitting-side ARQ layer over a wireless resource, the receiving-side ARQ layer receives a reception failure indicator provided from the HARQ layer, checks a type of the reception failure indicator, and controls transmission of a status report message between ARQ layers.

Therefore, the present invention minimizes duplicate retransmission of the ARQ packet taking into account retransmission states of the HARQ operation and the ARQ operation, and prevents reckless use of the limited wireless resources.

As a result, the fast retransmission of the missing packet improves the rate of the high-speed packet service, preventing the transmission delay of the high-speed packet service and the transmission delay in response to the retransmission request.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for requesting packet retransmission in a wireless communication system, the method comprising:
   checking, by a receiving-side Automatic Retransmission reQuest (ARQ) layer, sequence numbers of received packets to determine whether there is any missing packet, and if there is a missing packet starting a first timer in association with the missing packet;
   stopping the first timer upon receiving an Hybrid ARQ (HARQ) reception failure indicator corresponding to the missing packet, provided from a receiving-side HARQ layer; and
   stopping generation of a status report message corresponding to the missing packet, and waiting for an ARQ packet corresponding to the missing packet, retransmitted from a transmitting-side ARQ layer.

2. The method of claim 1, wherein the HARQ reception failure indicator includes an indicator indicating that the missing packet occurs even though HARQ retransmission is performed for a number of times equal to the maximum number of retransmissions.

3. The method of claim 1, further comprising:
   sending to a transmitting-side HARQ layer, by the receiving-side HARQ layer, a Non-ACKnowledged (NACK) signal corresponding to the detected missing packet;
   performing, by the transmitting-side HARQ layer, HARQ retransmission on an HARQ packet within the predetermined maximum number of retransmissions in response to the NACK signal;
   sending to the transmitting-side ARQ layer, by the transmitting-side HARQ layer, a Local NACK signal indicating that a missing packet occurs even after the maximum number of retransmissions; and
   retransmitting to the receiving-side ARQ layer, by the transmitting-side ARQ layer, an ARQ packet corresponding to the Local NACK signal.

4. A method for requesting packet retransmission in a wireless communication system, the method comprising:
   detecting, by a receiving-side Hybrid Automatic Retransmission reQuest (HARQ) layer, an HARQ reception failure according to a missing packet, and sending a reception failure indicator corresponding to the missing packet to a receiving-side Automatic Retransmission reQuest (ARQ) layer;
   starting, by the receiving-side ARQ layer, a second timer in response to the reception failure indicator;
   checking, by the receiving-side ARQ layer, a sequence number of a packet provided from the receiving-side HARQ layer to detect presence of a missing packet, and stopping the second timer upon detecting the presence of a missing packet;
   generating, by the receiving-side ARQ layer, a status report message corresponding to the missing packet, and sending the status report message to a transmitting-side ARQ layer; and
   waiting for an ARQ packet retransmitted from the transmitting-side ARQ layer.

5. The method of claim 4, wherein the HARQ reception failure indicator includes an indicator indicating that the missing packet occurs due to an HARQ Non-ACKnowledged/ACKnowledged (NACK/ACK) error before the maximum number of retransmissions.

6. The method of claim 5, further comprising:
   waiting, by the receiving-side ARQ layer, for the missing ARQ packet for a set time of the second timer, and if the second timer expires, sending a status report message corresponding to the missing ARQ packet to the transmitting-side ARQ layer.

7. An apparatus for requesting packet retransmission in a wireless communication system, the apparatus comprising:
   a Hybrid Automatic Retransmission reQuest (HARQ) layer for requesting HARQ retransmission by checking a received packet; and
   an Automatic Retransmission reQuest (ARQ) layer including a first timer used for waiting for transmission of a status report message corresponding to a missing packet for a set time, and a status report generator for checking a packet provided from the HARQ layer to detect presence/absence of a missing packet, starting the first timer, stopping the first timer upon receipt of an HARQ reception failure indicator caused by HARQ retransmission from the HARQ layer, stopping the transmission of the status report message, and waiting for an ARQ packet retransmitted from a transmitting-side ARQ layer according to the missing packet.

8. The apparatus of claim 7, wherein the ARQ layer includes a reception buffer and wherein the reception buffer stores packets normally received from the HARQ layer.

9. The apparatus of claim 7, wherein the status report generator detects the presence of a missing packet by comparing sequence numbers of a packet with a sequence number last stored in a reception buffer and a packet provided from the HARQ layer.

10. The apparatus of claim 7, wherein the HARQ reception failure indicator includes an indicator indicating that the missing packet occurs even though HARQ retransmission is performed a number of times equal to the maximum number of retransmissions.

11. The apparatus of claim 7, wherein the transmitting-side ARQ layer receives from a transmitting-side HARQ layer a Local Non-ACKnowledged (NACK) signal indicating that a missing packet occurs even after the maximum number of retransmissions, and retransmits to a receiving-side ARQ layer an ARQ packet corresponding to the Local NACK signal.

12. An apparatus for requesting packet retransmission in a wireless communication system, the apparatus comprising:

a Hybrid Automatic Retransmission reQuest (HARQ) layer for requesting HARQ retransmission by checking a received packet; and an Automatic Retransmission reQuest (ARQ) layer including a second timer used for waiting for transmission of a status report message corresponding to a missing packet for a set time, and a status report generator for starting the second timer upon receipt an HARQ reception failure indicator caused by HARQ retransmission from the HARQ layer, checking a packet provided from the HARQ layer to detect presence/absence of a missing packet, stopping the second timer upon detecting the presence of a missing packet, generating a status report message corresponding to the detected missing packet, sending the status report message to a transmitting-side ARQ layer, and waiting for an ARQ packet retransmitted in response to the status report message.

13. The apparatus of claim 12, wherein the HARQ reception failure indicator includes an indicator indicating that the missing packet occurs due to an HARQ Non-ACKnowledged/ACKnowledged (NACK/ACK) error before the maximum number of retransmissions.

14. The apparatus of claim 12, wherein the receiving-side ARQ layer waits for the missing ARQ packet for a set time of the second timer, and if the second timer expires, generates and sends to the transmitting-side ARQ layer a status report message corresponding to the missing ARQ packet.

* * * * *